UNITED STATES PATENT OFFICE.

CHARLES E. POPE, OF PITTSBURG, PENNSYLVANIA.

REFRACTORY BRICK FOR METALLURGICAL AND OTHER USES.

944,692.     Specification of Letters Patent.     Patented Dec. 28, 1909.

No Drawing.     Application filed August 15, 1908. Serial No. 448,734.

*To all whom it may concern:*

Be it known that I, CHARLES E. POPE, a citizen of the United States, residing at Pittsburg, Pennsylvania, have invented certain new and useful Improvements in Refractory Brick for Metallurgical and other Uses, of which the following is a specification.

Owing to the higher heats and increased friction which now prevails as compared with former decades, many of the types of silica bricks, flint clay bricks, and other fire bricks which were formerly adequate for their respective purposes are no longer able to satisfactorily stand the high heats and friction combined with the chemical attack of the gases, slags, and other agencies to which they are subjected not only in steel furnaces and other metallurgical furnaces, but also in many flues, furnaces, and various other uses where materials highly refractory not only to heat, but to friction and such attendant agencies are required. The shrinkage in materials composed largely of alumina and the expansion and contraction in compositions largely of silica, add to the great difficulties in producing satisfactory brick.

The object of the present invention is to produce a highly refractory brick consisting mainly or entirely of Portland cement materials but without the defects and disadvantages existing in bricks made of pure finely ground Portland cement mixed with water and molded to form.

I have found that unground cement clinker nodules preferably broken into fragments so as to present angular edges and then bonded together with sufficient Portland cement, will make an excellent and highly refractory brick which, while readily withstanding a temperature of three thousand degrees Fahrenheit, will also prove highly resistant to the wear and tear due to excessive friction. Such a brick, can, for example, be satisfactorily used under prevailing conditions in place of magnesite brick in acid furnaces. The intimate union between the Portland cement and the cement clinker nodules due perhaps to the similar nature of the two and perhaps to some effect which the water in the cement exerts in uniting the cement very intimately with the unground clinker fragments, produces a very desirable composite brick in which the nodules seem to play the part of resisting mechanical and perhaps chemical attack in a way which the Portland cement is not in itself able to do.

In preparing the improved brick I prefer to take the cement clinker nodules just as they come from the rotary kiln and crush or break the larger masses into jagged form, making sharp fragments. I prefer also to sort the different sizes of fragments, including smaller unbroken nodules, into two sizes, the larger of which will not pass through a mesh having one-eighth inch openings, and to mix approximately three parts of the coarser and three parts of the finer material and to bond the whole together with one part of the finished Portland cement with the usual added percentage of water, forming and molding the brick in the desired form, and then allowing it to set. The same composition may be used for repairing or making linings while it is in the plastic condition, as will be well understood. The percentages given may be varied according to the variation in sizes of the cement clinker fragments, following principles well understood in making concretes. The proportions I have stated are those which are very satisfactory under average conditions.

While I do not mean to limit myself exactly to the proportions stated, approximately six parts of broken nodules to one of cement should be used in order that the more finely divided angular fragments may serve to substantially fill the voids between the larger fragments and all be nearly in contact so as to mutually support each other and to protect to a large extent the cement bond between them and minimize the quantity of cement used.

What I claim and desire to secure by Letters Patent is:

1. Refractory brick composed of approximately three parts coarse broken cement clinker nodules, three parts relatively fine broken nodules, and a bond of one part Portland cement.

2. Refractory brick composed of approximately six parts broken Portland cement nodules comprising angular fragments of different sizes bonded together with one part Portland cement, whereby the said fragments present angular edges and are closely bonded together by the said portion of cement.

In testimony whereof I have signed this specification in the presence of two subscribing witnesses.

CHARLES E. POPE.

Witnesses:
JOHN F. KRAFT,
H. M. EASTON.